United States Patent [19]

Sollychin et al.

[11] Patent Number: 5,493,590
[45] Date of Patent: Feb. 20, 1996

[54] CRITICAL POWER ENHANCEMENT SYSTEM FOR A PRESSURIZED FUEL CHANNEL TYPE NUCLEAR REACTOR USING CHF ENHANCEMENT APPENDAGES

[75] Inventors: Rayman Sollychin; Dionysius C. Groeneveld; Alan D. Lane, all of Deep River, Canada

[73] Assignee: Atomic Energy of Canada Limited, Ottawa, Canada

[21] Appl. No.: 204,497

[22] Filed: Mar. 2, 1994

[51] Int. Cl.⁶ .......................... G21C 15/00; G21C 19/28
[52] U.S. Cl. .......................... 376/401; 376/442; 376/454; 376/443; 376/448
[58] Field of Search .......................... 376/454, 401, 376/453, 457, 444, 448, 442, 443; 976/DIG. 83, DIG. 63

[56] References Cited

U.S. PATENT DOCUMENTS

| | | | |
|---|---|---|---|
| Re. 28,362 | 3/1975 | Calvin | 176/78 |
| 3,372,093 | 3/1968 | Wikhammer et al. | 176/54 |
| 3,629,065 | 12/1971 | Knox | 176/54 |
| 3,663,367 | 5/1972 | Calvin | 176/78 |
| 3,749,640 | 7/1973 | Israel | 176/78 |
| 3,809,609 | 5/1974 | Krawiec et al. | 176/78 |
| 3,862,000 | 1/1975 | Pugh et al. | 176/78 |
| 4,474,231 | 10/1984 | Staub et al. | 165/133 |
| 4,678,631 | 7/1987 | Taleyarkham | 376/444 |
| 4,698,204 | 10/1987 | Taleyarkhan | 376/439 |
| 4,708,846 | 11/1987 | Patterson et al. | 376/444 |
| 4,725,403 | 2/1988 | Buettiker | 376/439 |
| 4,738,819 | 4/1988 | Taleyarkhan | 376/444 |
| 4,740,350 | 4/1988 | Taleyarkhan | 376/441 |
| 4,775,510 | 10/1988 | Bryan | 376/443 |
| 4,970,048 | 11/1990 | Noailly | 376/439 |
| 5,089,220 | 2/1992 | Nylund | 376/439 |
| 5,180,548 | 1/1993 | Verdier | 376/439 |

FOREIGN PATENT DOCUMENTS

| | | | |
|---|---|---|---|
| 810849 | 4/1969 | Canada | 359/50 |
| 963185 | 2/1975 | Canada . | |
| 1104729 | 7/1981 | Canada . | |
| 1115863 | 1/1982 | Canada | 359/64 |
| 0007688 | 2/1980 | European Pat. Off. . | |
| 442544 | 1/1968 | Switzerland . | |
| 1061878 | 3/1967 | United Kingdom . | |

OTHER PUBLICATIONS

Database WPI, Week 9338, Derwent Publications Ltd., London, GB; AN 93-300597, & Ro, A, 103 780 (Institutui, De Cercetari Nucleare, Pitesti) 22 Nov. 1993.

Primary Examiner—Peter A. Nelson
Assistant Examiner—Meena Chelliah
Attorney, Agent, or Firm—Gowling, Strathy & Henderson; Eugene E. Proulx

[57] ABSTRACT

A critical power enhancement system is provided for a pressurized fuel channel type nuclear reactor comprising a plurality of fuel bundles contained in a fuel channel and containing a plurality of fuel elements horizontally oriented within the fuel channel. The system comprises at least one appendage strategically located on each of certain fuel elements along its length and projecting outwardly from the surface of the fuel element. The appendages generate turbulence in the coolant flowing at locations along the length of the fuel bundle, where the critical heat flux is most likely to occur. The presence of the appendages suppress the occurrence of the critical heat flux in the fuel bundle thereby increasing the safety limit on the maximum power that can be produced by the reactor.

20 Claims, 4 Drawing Sheets

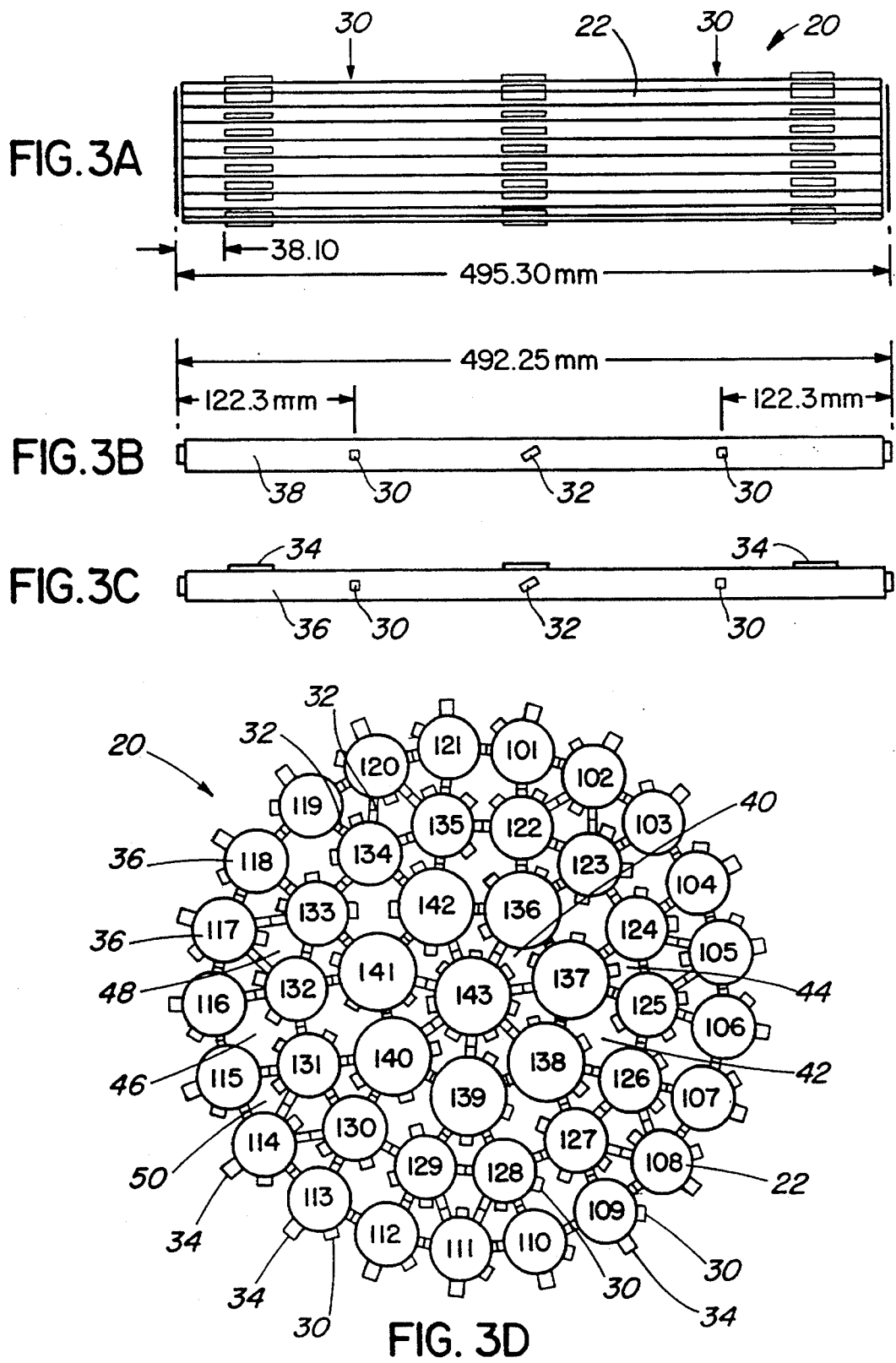

CRITICAL POWER ENHANCEMENT SYSTEM FOR A PRESSURIZED FUEL CHANNEL TYPE NUCLEAR REACTOR USING CHF ENHANCEMENT APPENDAGES

The present invention relates to a critical power enhancement system for a pressurized fuel channel type nuclear reactor by inducing turbulence at strategic locations within fuel bundles of the reactor and thereby improving critical heat flux of the fuel bundles.

BACKGROUND OF THE INVENTION

An example of a pressurized fuel channel type nuclear reactor is the CANDU™ reactor which contains a plurality of pressure tubes defining fuel channels therethrough. Each fuel channel is horizontally oriented and contains a plurality of fuel bundles, generally arranged end to end. Each fuel bundle contains a set of solid fuel rods or elements containing fissionable material. High pressure heavy water coolant enters the fuel channel at one end, flows over the fuel bundles and through the gaps between the fuel elements so as to cool the fuel elements and remove the heat from the fission process, and exits from the fuel channel at the other end. This heat is subsequently transferred by the coolant to a heat exchanger which produces steam that drives a turbine to produce electrical energy. The heavy water flowing in the water gaps is pressurized and does not boil significantly.

The maximum power that can be produced within a fuel channel is determined by the maximum power that can be produced safely by individual fuel bundles within that channel. This maximum power within the fuel channel is normally referred to as the Critical Channel Power or CCP. The maximum power that can be produced safely by any given fuel bundle within that channel is called the Critical Bundle Power, and is determined by the variation in power production within that bundle, the corresponding local coolant conditions, and the design of the fuel bundle. The Critical Bundle Power is the power corresponding to the onset of a significant decrease in the efficiency of heat transfer from the bundle to the coolant, and the local heat flux at which this happens is referred to as the Critical Heat Flux or CHF. Since the high temperatures that can occur when the CHF is exceeded may damage the fuel bundle, the channel power and flow conditions are set to ensure that CHF is never exceeded in any bundle.

CHF occurs on a heated fuel element when some pan of its surface can no longer be continuously wetted by the liquid coolant. There are two types of CHF, i.e., the departure from nucleate boiling (DNB) type and the liquid depletion type. The actual mechanism for this depends upon the location of the fuel element, and the thermal hydraulic conditions of the coolant surrounding it.

In order to ensure the CHF is never exceeded in any bundle, a safety factor or operating margin is applied to the CCP, which in turn results in the power that can be produced by the pressurized fuel channel type of nuclear reactor being reduced by approximately the same factor. If, however, the CHF could be increased, the power that could be produced by the reactor could also be increased. A similar situation also applies to other types of water-cooled nuclear reactors.

Improvements of CHF on fuel bundles for pressure vessel type light water reactors have been suggested through the following separate methods: (i) addition of extra grid spacers and mixing vanes (U.S. Pat. No. 4,698,204 issued to Taleyarkhan on Oct. 6, 1987); (ii) installation of a tubular flow diverting channel, flow diverting panels or other flow diverting/deflecting devices (U.S. Pat. No. 4,738,819 issued to Taleyarkhan on Apr. 19, 1988, U.S. Pat. No. 4,678,631 issued to Taleyarkhan on Jul. 7, 1987, U.S. Pat. No. 3,663,367 issued to Calvin on May 16, 1972, and Canadian Patent 1,115,863 issued to the Babcock & Wilcox Company on Jan. 5, 1982); (iii) cavitating the element sheath surface (U.S. Pat. No. 4,474,231 issued to Staub et al. on Oct. 2, 1984); and (iv) installation of a special flow distributing channel within the fuel element assembly (U.S. Pat. No. 4,708,846 issued to Patterson et al. on Nov. 24, 1987).

The CHF enhancement methods proposed for pressure vessel type light water reactors are not directly applicable to fuel bundles of pressurized fuel channel type nuclear reactors, such as the CANDU™ reactor. This is mainly because of the physical differences between fuel assemblies in the pressure vessel type reactors and the fuel bundles of the pressurized fuel channel type reactors. The pressure vessel type reactor uses very long fuel assemblies which stretch the full length of the reactor, and uses much larger spacing between the individual elements. The type of flow turbulence promoter necessary to provide optimal CHF enhancement in the pressure vessel type reactors, such as extra grid spacers and flow diverting devices, may impose unnecessarily high hydraulic resistance in the fuel channels of the pressurized fuel channel type reactor. Their introduction would also require mechanical changes to the fuel bundle of the pressurized fuel channel type reactor which would affect its overall behaviour. They are therefore not practical for pressurized fuel channel type reactors.

Canadian Patent No. 1,115,863 discloses provision of ridges on guide tubes for control rods. This patent specifies that the subject invention is suitable for preventing early occurrence of the departure from nucleate boiling (DNB) type of CHF, which is likely to occur near the gap between adjacent fuel elements, or between guide tubes and fuel elements. The guide tube in Canadian Patent 1,115,863, is effectively unheated, and therefore has a relatively colder surface than the surrounding fuel elements. The ridges are used to strip liquid off the cold guide tube so that it will be available to the hot fuel elements. The guide tubes are a unique feature of fuel assemblies for pressure-vessel-type, water cooled reactors. In addition, liquid depletion type of CHF is more likely to occur than the DNB type of CHF in a pressurized fuel channel type reactors. The invention described in Canadian Patent 1,115,863 is only applicable to the pressure vessel type of reactor and is not applicable to pressurized fuel channel type reactors where there are no guide tubes.

A method has been proposed, as shown in FIG. 1, to improve CHF in pressurized fuel channel type reactors by the installation of roughness rings 10 on the inner surface of fuel channels 12 (U.S. Pat. No. 3,372,093 issued to Wikhammer et al. on Mar. 5, 1968). The CHF enhancement is accomplished since the roughness rings 10 create turbulence and redistribute liquid from the unheated channel wall to the fuel bundle 14 supported by grid spacers 16 within the fuel channel 12.

This CHF enhancement method proposed for pressurized, fuel-channel type reactors has the following drawbacks:

The presence of roughness ring on the inner surface of the fuel channel creates practical difficulties for the passing of fuel bundle within the fuel channel. The provision of the roughness ring on the inner surface of the fuel channel would therefore require mechanical changes to the fuelling system of the pressurized fuel channel type reactors, which is undesirable. In addition, channel roughness rings increases the hydraulic resistance in the fuel channel significantly. As discussed below, an increase in hydraulic resistance in the fuel channel causes the coolant flow to decrease, and hence causes the CHF to occur at a lower fuel channel power. The resulting CCP is either worse than the case without the CHF enhancement devices, or is only improved to an insignificant degree. High hydraulic resistance may also reduce the coolant flow through the fuel channels in an existing reactor that was not designed to accommodate a large pressure-drop resulting from such a large hydraulic resistance, thus affecting the overall performance of the reactor.

SUMMARY OF THE INVENTION

The present invention seeks to provide a critical power enhancement system for a pressurized fuel channel type nuclear reactor, which improves the critical heat flux of the fuel bundles without significantly increasing the hydraulic resistance in the fuel channel.

In accordance with one aspect of the present invention, there is provided a fuel element assembly for use in a nuclear reactor using a pressurized water coolant flowing in a plurality of fuel channels, the fuel element comprising: an elongated fuel element containing fissionable material; a plurality of spacers attached to the fuel element; a plurality of bearing pads attached to certain type of fuel element; and at least one CHF enhancement appendage, attached to the fuel element along its length thereof and projecting outwardly from the surface of the fuel element for generating turbulence in the coolant flowing along the length of the fuel element downstream of the location of the CHF enhancement appendages. The CHF enhancement appendages are functionally different from spacers for separating the fuel elements from each other or bearing pads for providing load bearing to the fuel bundle.

In accordance with another aspect of the present invention, there is provided a fuel bundle assembly for use in a nuclear reactor using a pressurized water coolant flowing in a plurality of fuel channels, the fuel bundle assembly comprising: a fuel bundle containing a plurality of fuel elements, each of the fuel elements having a length and ends; and at least one CHF enhancement appendage attached to each of certain fuel elements along the length thereof and projecting outwardly from the surface of the each fuel element for generating turbulence in the coolant flowing along the length of the fuel bundle downstream of the locations of the CHF enhancement appendages. The fuel elements are arranged in a bundle form with both of the ends of the fuel elements mechanically hold together, and separated from each other by a pair of spacers each attached to one of two neighbouring fuel elements. The fuel elements located on the outer ring of the fuel bundle are further provided with bearing pads for providing load bearing to the fuel bundle.

In accordance with another aspect of the present invention, there is provided a pressurized fuel channel type nuclear reactor which uses pressurized water as a coolant, the reactor comprising: a plurality of pressure tubes each defining a fuel channel therethrough, the pressure tubes having a length, an inlet for introducing the coolant into the fuel channels, and an outlet for discharging the coolant from the fuel channels; a plurality of fuel bundles contained within each of the pressure tubes, each of the fuel bundles containing a plurality of fuel elements therein, each of the fuel elements having a length and ends, the length of each fuel element being parallel to the length of the pressure tube; and at least one CHF enhancement appendage is provided on certain fuel elements along the length thereof and projecting outwardly from the surface of the fuel element for generating turbulence in the coolant flowing along the length of the fuel bundle downstream of the locations of the CHF enhancement appendages. The fuel elements are arranged in a bundle form with both of the ends of the fuel elements mechanically held together and separated from each other by a pair of spacers each attached to one of two neighbouring fuel elements. The fuel elements located on the outer ring of the fuel bundle are further provided with bearing pads for providing load bearing to the fuel bundle.

In accordance with another aspect of the present invention, there is provided a critical power enhancement system for a pressurized fuel channel type nuclear reactor which uses pressurized water as a coolant, the reactor comprising: a plurality of pressure tubes each defining a fuel channel therethrough, the pressure tubes having a length, an inlet for introducing the coolant into the fuel channels, and an outlet for discharging the coolant from the fuel channels; a plurality of fuel bundles contained within each of the pressure tubes, each of the fuel bundles containing a plurality of fuel elements therein, each of the fuel elements having a length and ends, the length of each fuel element being parallel to the length of the pressure tube; the critical power enhancement system comprising a plurality of CHF enhancement appendages attached to certain fuel elements along the length thereof and projecting outwardly from the surface of the fuel element into the coolant flow space within the fuel channel surrounded by fuel elements, for generating turbulence in the coolant flowing along the length of the fuel bundle downstream of the locations of the CHF enhancement appendages. The fuel elements are arranged in a bundle form with both of the ends of the fuel elements mechanically hold together and separated from each other by a pair of spacers each attached to one of two neighbouring fuel elements. The fuel elements located on the outer ring of the fuel bundle are further provided with bearing pads for providing load bearing to the fuel bundle. The locations of the CHF enhancement appendages within the fuel bundle are such that the turbulence generated by the CHF enhancement appendages occurs at locations within the fuel bundle where CHF is most likely to occur.

BRIEF DESCRIPTION OF THE DRAWINGS

These and other features of the invention will become more apparent from the following description in which reference is made to the appended drawings wherein:

FIG. 3A is a side view of a specific CANDU™ fuel bundle, the CANFLEX™ Mk. 4 Bundle with CHF enhancement appendages according to the present invention;

FIG. 3B is a side view of an inner fuel element of the fuel bundle shown in FIG. 3A;

FIG. 3C is a side view of an outer fuel element of the fuel bundle shown in FIG. 3A;

FIG. 3D is a cross-sectional view of the fuel bundle shown in FIG. 3A;

DESCRIPTION OF PREFERRED EMBODIMENT

Figure 1:
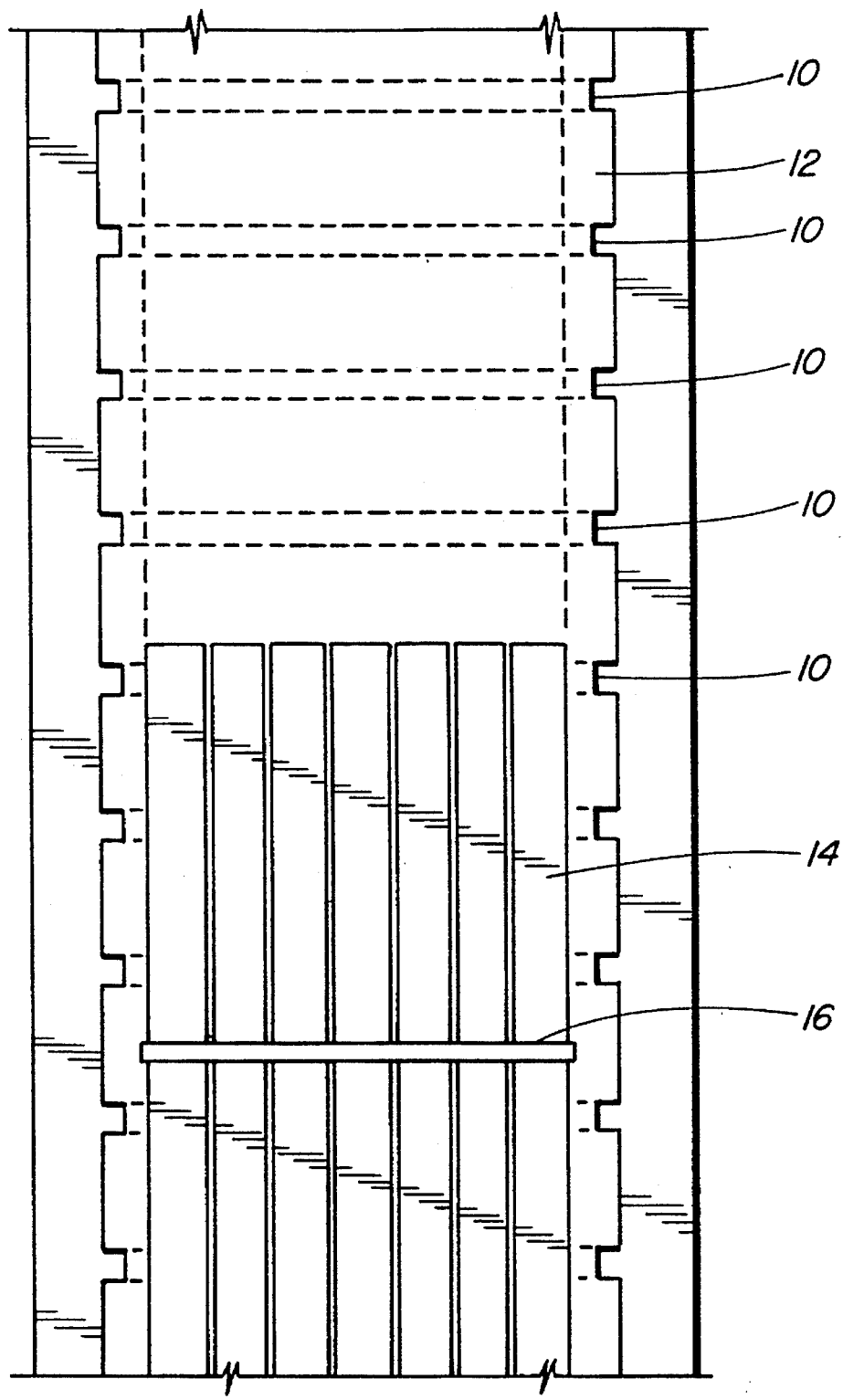
FIG. 1 is a cross-sectional view of a prior art fuel channel of a pressurized fuel channel type reactor with internal roughness rings.
Figure 2A:
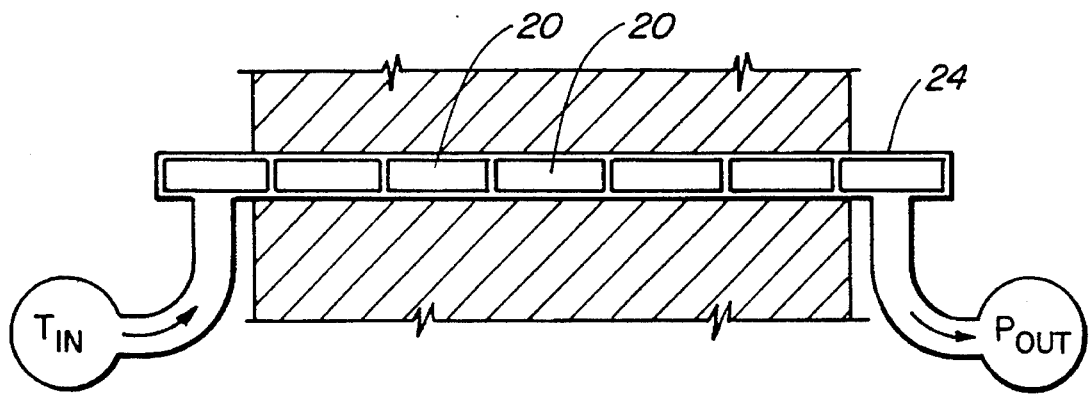
FIG. 2A is a schematic view for explanation of a coolant flow in a fuel channel.
Figure 2B:
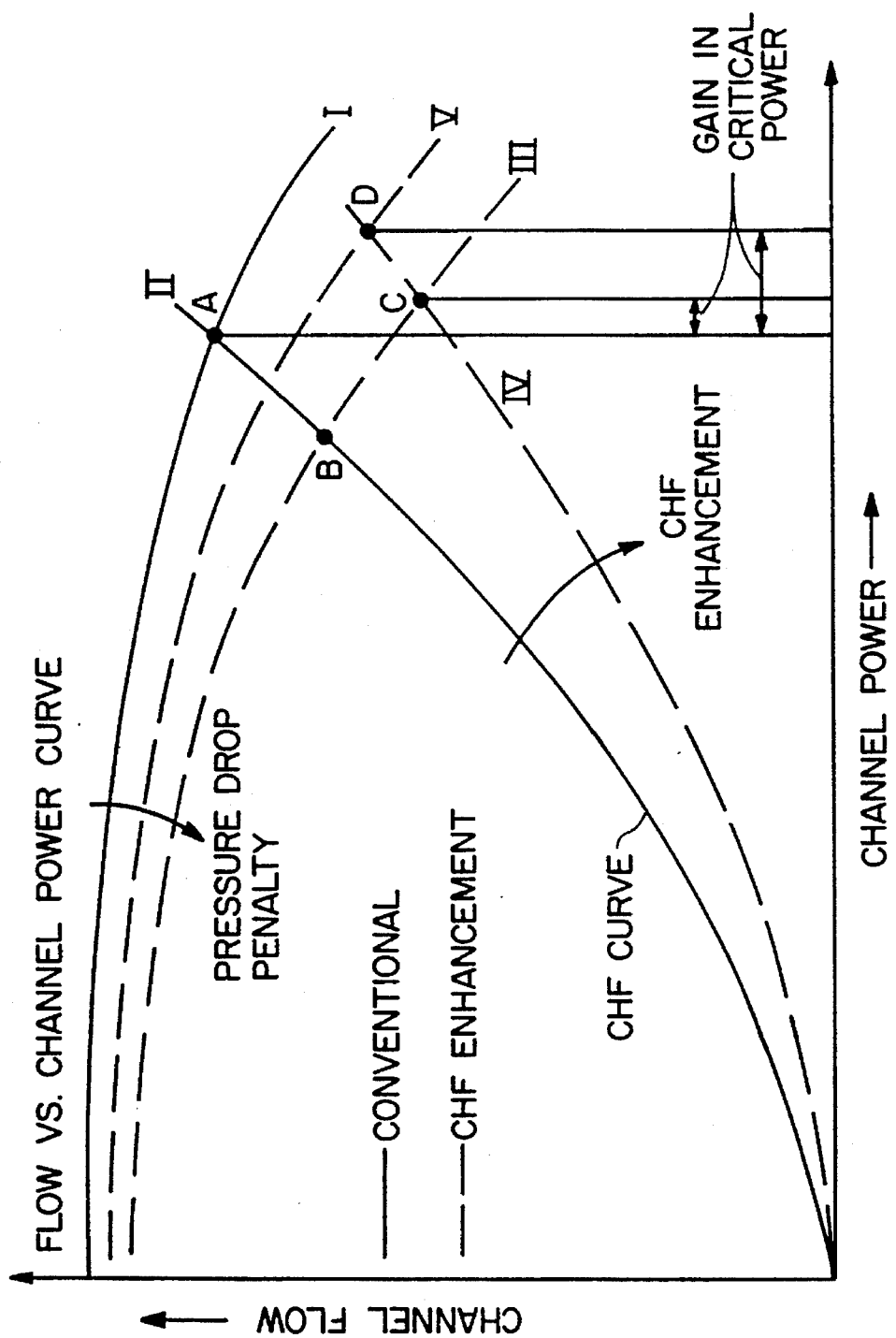
FIG. 2B is a graph showing effect of the CHF enhancement and its associated pressure drop penalty on CCP.

The increase in CCP can be achieved by raising the CHF of the fuel bundle in such a way that it will not cause a significant increase in hydraulic resistance in the fuel channels. FIG. 2A schematically shows a coolant flow in a fuel channel defined by pressure tube 24 which contains fuel bundles 20. Curve I in FIG. 2B represents schematically the variation in fuel channel flow with channel power, based on the hydraulic characteristics of the fuel channel. For a given channel inlet temperature $T_{IN}$ and channel outlet pressure $P_{OUT}$ as shown in FIG. 2A, the variation of CHF with channel flow is shown by Curve II, so that CHF occurs at condition A. As can be seen in FIG. 2B, an increase in channel hydraulic resistance will increase the coolant pressure-drop and thus causes the flow to decrease (Curve III). This change in the fuel channel's hydraulic characteristics may shift the occurrence of CHF in the fuel channel from condition A (on Curve I) to condition B (on Curve III). The combined effect of the increase in CHF (a shift from Curve II to Curve IV) and the increase in hydraulic resistance may bring the CHF to occur at condition C. The difference between the fuel channel power corresponding to condition C and that corresponding to condition A is the net gain in CCP. If, however, a different method of producing the same increase in CHF were used that produced a smaller increase in hydraulic resistance (Curve V), then CHF may occur at condition D, resulting in a much increased net gain in CCP.

In a critical power enhancement system for a pressurized fuel channel type nuclear reactor in accordance with the present invention, certain fuel elements are each provided with at least one CHF enhancement appendage, or "button", at predetermined strategic locations along the length of the fuel elements. The CHF enhancement appendages project into a subchannel, which is a coolant flow space surrounded by fuel elements, and generates turbulence in the coolant flowing within the subchannel downstream of the locations of the appendages.

The provision of the CHF enhancement appendages according to the present invention increases a turbulence level of the coolant at locations within the fuel bundle where CHF is most likely to occur without significantly increasing the hydraulic resistance in the fuel channel.

For the flow conditions corresponding to the liquid depletion type of CHF, a large fraction of the coolant is in the form of vapour, with a large number of liquid droplets flows dispersed in it. A thin layer of the liquid exists on the outer surface of the fuel elements. The liquid removes heat from a fuel element surface much more effectively than vapour. The droplets in the vapour flow are continuously being deposited onto the liquid film, hence increasing the thickness of the liquid film. On the other hand, the liquid film is continuously being sheared off by turbulent force (this is called entrainment) and liquid is continuously being evaporated from its surface by the heat from the hot surface. CHF occurs when there is a depletion of the liquid film.

The CHF enhancement appendages suppress the occurrence of the liquid depletion type of CHF as the presence of the appendages increases the turbulence level in the coolant flow which, in turn, increases the heat transfer rate. This, in general, lowers the fuel element surface temperature for a given fuel bundle power. Therefore, dryout of the liquid film on the fuel element surface will occur at a higher power level, hence resulting in a higher value of CHF. Furthermore, the increase in turbulence level increases the rate of entrainment as well as increase the rate of droplet deposition. These two mechanisms have opposite effects in sustaining the liquid film thickness, and hence in suppressing CHF.

For CHF of the DNB type, the presence of the CHF enhancement appendages increases turbulence, which causes partial or complete destruction of the insulating bubbly layer adjacent to the hot fuel element surface, thus suppressing CHF at these conditions.

Each of the appendages is attached only to individual fuel elements, without coming into any mechanical contact with other fuel elements. Unlike the spacers or bearing-pads, these appendages are divorced from the functions of spacing the fuel elements or providing load beating to the fuel elements. Accordingly, the present critical power enhancement system does not alter the mechanical structure of the fuel bundle. When compared with the attachment of spacers or bearing-pads which are subject to mechanical interactions, this allows significant cost savings, and avoids the undesirable "braze heat-affected zones" that are associated with the brazing process required for the attachment of appendages subject to mechanical interactions such as the spacers and bearing pads.

The actual location of the CHF enhancement appendages is determined according to predicted locations of the occurrence of potential CHF within the fuel bundle. The actual shape and size of the CHF enhancement appendages are determined according to predicted heat transfer and flow conditions of the coolant along the fuel bundle prior to the occurrence of the potential CHF. In turn, the location of the CHF and the heat transfer and flow conditions of the coolant prior to the occurrence of a CHF are predetermined for a specific bundle design, actual power distribution within the fuel bundle that will be appropriate for the intended use of the fuel bundle, and reactor conditions. The CHF enhancement appendages can be re-arranged to provide an optimum CCP for different fuel bundle designs, different power distribution within the fuel bundle, or specific reactor operational requirements. Thus, the increase in hydraulic resistance in the fuel channel can be systematically minimized, resulting in the maximum gain in the critical power, as described above referring to FIG. 2B. Thus, the present critical power enhancement system is sufficiently flexible that it can be applied to any fuel bundle of the pressurized fuel channel type reactors.

Specifically, the heat transfer and flow conditions of the coolant prior to a CHF within a specific design of fuel bundle, and the location of the CHF in the fuel bundle are predicted through experimental and computer code simulations of a particular use of the specific fuel bundle in a specific reactor. Based on these predictions, a critical power enhancement system suitable for these specific requirements is defined which consists of specifications on the shape, size and locations of CHF enhancement appendages within each of the fuel bundles of this specific design. The specification for this particular critical power enhancement system is then further optimized through experimental testing, where the increase in hydraulic resistance is minimized without significantly jeopardizing its CHF enhancement performance.

In order to minimize the increase in hydraulic resistance in the fuel channel due to attachment of the appendages, each appendage has a cylindrical shape or a streamlined shape. The cross-sectional area of each of the appendage at the bottom, where the appendage is attached to the fuel element, is preferably in a range of 3 mm² to 11 mm², and the height of each of the appendage from the bottom is preferably in a range of 0.6 mm to 2.3 mm.

The number of CHF enhancement appendages provided in each subchannel, i.e., flow space surrounded by fuels bundles, is preferably one to four, and is a function of the subchannel flow area and the size of the appendages. When more than two CHF enhancement appendages are provided on each of certain fuel elements at axially symmetrical locations in light of the middle of the length of the fuel bundle, the fuel bundles may be advantageously inserted into a pressure tube in either direction. The distance between the appendages and the nearest end of the fuel elements is preferably in a range of 5 to 20 cm when two appendages are attached to each fuel element. Each CHF enhancement appendage must be attached to the surface of the fuel elements such that it does not come off during the operation of the reactor. The manner of attaching the CHF appendages to the fuel elements is within scope of techniques of those to whom the present invention is addressed. The CHF enhancement appendages may be made of the same material as the fuel elements.

FIGS. 3A and 3D show an embodiment of attachment of the appendages to a specific CANDU™ fuel bundle, the CANFLEX™ Mk. 4 Bundle with natural uranium, to be used in Wolsung Reactor No.1. The CANFLEX™ fuel bundle 20 is comprised with 43 fuel elements 22 which are separated from each other by spacers 32. Outer elements 36 (101–121 in FIG. 3D) are further provided with bearing pads 34. The fuel elements of a CANFLEX™ Bundle are of two sizes, that is, the centre fuel element 143 and all seven fuel elements 136–142 of the most inner ring adjacent to the centre fuel element 143 have an outside diameter of 13.5 mm, and the remaining fuel elements 101–135, which consists of 21 fuel elements 101–121 in the outer most ring of the fuel bundle and 14 fuel elements 122–135 in the middle ring between the inner ring and the outer ring, have an outside diameter of 11.5 mm. The location of the spacers 32 and bearing pads 34 for CANFLEX™ Mk. 4 Bundle is as shown in FIG. 3B and 3C.

In this embodiment, 182 CHF enhancement appendages 30 of cylindrical shape are divided equally and provided on two bundle axial locations, each of which locations has a distance of 122.3 mm from each end of the fuel bundle 20, as shown in FIG. 3A. Each of the CHF enhancement appendages 30 is attached to a specific circumferential location on the outer surface of fuel elements and projects toward the centre of a subchannel being defined as the coolant flow space surrounded by neighbouring fuel elements without including an inter-fuel element gap wherein an inter-fuel element gap is closest distance between two neighbouring fuel elements. The arrangement of the attachment of the CHF enhancement appendages 30 at each bundle axial location is identical and can be described in the following.

As shown in FIG. 3D, at each bundle axial location, there are two CHF enhancement appendage 30 projecting into each of the six subchannels 40 surrounding the centre fuel element 143, one from the centre fuel element 143 and the other from one of the two inner ring fuel elements 136–142.

There are two types of subchannels between the inner ring and the middle ring. The large subchannel 42 is each provided with two CHF enhancement appendages 30, one from each of the large fuel elements 136–142 of the inner ring, and the other from each of the small fuel elements 123, 125, 127, 129, 131, 133, 135 of the middle ring directly opposite to the large fuel elements 136–142. The small subchannel 44 between the inner ring and the middle ring is each provided with one CHF enhancement appendage 30 attached to each of the large fuel elements 136–142 of the inner ring.

There are three types of subchannels between the middle ring and the outer ring. The largest subchannel 46 opposite from the large subchannel 42 between the inner ring and the middle ring is each provided with two CHF enhancement appendages 30 each attached to each of the two of the middle ring fuel elements 122–135. One of the small subchannels 48 between the middle ring and the outer ring, which is opposite to the small subchannel 44 between the inner ring and the middle ring, is each provided with one CHF enhancement appendage 30 attached to one of the outer ring fuel elements 101–121. In each of the remaining small subchannels 50 between the middle ring and the outer ring, there is also only one CHF enhancement appendage 30 provided, and each is attached to the middle ring fuel elements 122–135.

Finally, in each of the subchannels 52 between the outer ring and the pressure tube inner surface (not shown) surrounding the fuel bundle 20, there is one CHF enhancement appendage 30 provided which is attached to each of the outer ring fuel elements 101–121.

Figure 4A:
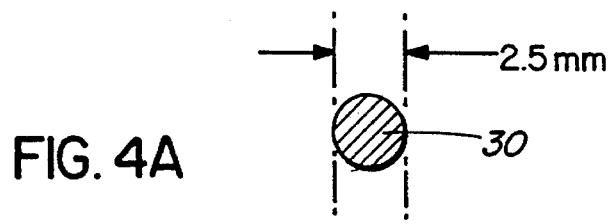
FIG. 4A is a top view of a CHF enhancement appendage used in the CANFLEX™ Mk. 4 Bundle as shown in FIG. 3A.
Figure 4B:
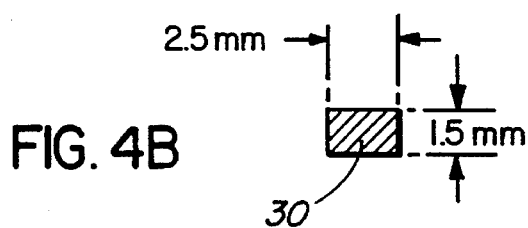
FIG. 4B is a side view of the CHF enhancement appendage shown in FIG. 4A.

As shown in FIGS. 4A and 4B, each appendage 30 has a cylindrical shape and is attached to each fuel element by one end of the cylinder. The diameter of the end of the cylinder is 2.5 mm and the height is 1.5 min.

It will be understood that various modifications may be made to the invention without departing from the spirit of the present invention.

The embodiments of the invention in which an exclusive property of privilege is claimed are defined as follows:

1. A fuel element assembly for use in a nuclear reactor using pressurized water as a coolant flowing in a plurality of fuel channels, said fuel element comprising:

an elongated fuel element containing fissionable material, said fuel element having opposed ends and a peripheral surface extending the length between said opposed ends; and at least one CHF enhancement appendage attached along the length of said fuel element and projecting outwardly from the peripheral surface of said fuel element for generating turbulence in said coolant flowing along said length of said fuel element downstream of the locations of said CHF enhancement appendage.

2. A fuel element assembly according to claim 1, wherein at least two CHF enhancement appendages are positioned symmetrically about the length of said fuel element.

3. A fuel element assembly according to claim 1, wherein said CHF enhancement appendage has a cylindrical shape having a top end and a bottom end where said CHF enhancement appendage is attached to said fuel element.

4. A fuel element assembly according to claim 3, wherein the cross-sectional area of said CHF enhancement appendage at said bottom end thereof is in a range of 3 mm² to 11 mm², and the height of said CHF enhancement appendage from said bottom end is in a range of 0.6 mm to 2.3 mm.

5. A fuel element assembly according to claim 1, wherein the distance between said CHF enhancement appendage and a nearest end of said fuel element is in a range of 5 cm to 20 cm.

6. A fuel bundle assembly for use in a nuclear reactor using pressurized water as a coolant flowing in a plurality of fuel channels, said fuel bundle assembly comprising:

a fuel bundle containing a plurality of elongated fuel elements, each of said fuel elements having opposed ends and a peripheral surface extending the length between said opposed ends;

at least one spacer for separating said fuel elements from each other;

at least one bearing pad attached to outer fuel elements for providing load bearing to said fuel bundle; and at least one CHF enhancement appendage attached to each of certain fuel elements along said length thereof and projecting outwardly from the peripheral surface of said each fuel element for generating turbulence in said coolant flowing along said length of said fuel bundle downstream of the locations of said CHF enhancement appendage.

7. A fuel bundle assembly according to claim 6, wherein at least two CHF enhancement appendages are positioned symmetrically about the length of each of said certain fuel elements.

8. A fuel bundle assembly according to claim 6, wherein said CHF enhancement appendage has a cylindrical shape having a top end and a bottom end where said CHF enhancement appendage is attached to one of said fuel elements.

9. A fuel bundle assembly according to claim 8, wherein the cross-sectional area of said CHF enhancement appendage at said bottom end thereof is in a range of 3 mm$^2$ to 11 mm$^2$, and the height of said CHF enhancement appendage from said bottom end is in a range of 0.6 mm to 2.3 mm.

10. A fuel bundle assembly according to claim 6, wherein the distance between said CHF enhancement appendage and a nearest one of said ends of said fuel elements is in a range of 5 cm to 20 cm.

11. A pressurized fuel channel type nuclear reactor which uses pressurized water as a coolant, said reactor comprising:

an elongated pressure tube defining a fuel channel therethrough, said pressure tube having a length, an inlet for introducing said coolant into said fuel channel, and an outlet for discharging said coolant from said fuel channel;

a plurality of elongated fuel bundles contained within said pressure tube, each of said fuel bundles containing a plurality of fuel elements therein, each of said fuel elements having opposed ends and a peripheral surface extending the length between said opposed ends, said length of each fuel element being parallel to said length of said pressure tube;

a plurality of spacers for separating said fuel elements from each other;

a plurality of bearing pads attached to outer fuel elements for providing load bearing to said fuel bundles; and at least one appendage provided on each of certain fuel elements along said length thereof and projecting outwardly from the peripheral surface of said each fuel element into coolant flow space within said fuel channel surrounded by fuel elements, for generating turbulence in said coolant flowing along said length of each of said fuel bundle downstream of the locations of said CHF enhancement appendages.

12. A pressurized fuel channel type nuclear reactor according to claim 11, wherein said CHF enhancement appendage is attached on each of said certain fuel elements at a location where said CHF enhancement appendages generates the turbulence at locations within the fuel bundle where CHF is most likely to occur.

13. A pressurized fuel channel type nuclear reactor according to claim 11, wherein one to four CHF enhancement appendages are provided in each of certain subchannel defined by a coolant flow space surrounded by some of said fuel elements which are adjacent to each other, and said coolant flow space excludes any inter-fuel element gap defined by the closest distance between any two neighbouring fuel elements.

14. A pressurized fuel channel type nuclear reactor according to claim 11, wherein said CHF enhancement appendage is attached to one of said certain fuel elements and has no contact with the other fuel elements.

15. A pressurized fuel channel type nuclear reactor according to claim 11, wherein at least two CHF enhancement appendages are positioned symmetrically about the length of each of said certain fuel elements.

16. A pressurized fuel channel type nuclear reactor according to claim 11, wherein said CHF enhancement appendage has a cylindrical shape having a top end and a bottom end where said CHF enhancement appendage is attached to said fuel element.

17. A pressurized fuel channel type nuclear reactor according to claim 16, wherein the cross-sectional area of said CHF enhancement appendage at said bottom end thereof is in a range of 3 mm$^2$ to 11 mm$^2$, and the height of said CHF enhancement appendage from said bottom end is in a range of 0.6 mm to 2.3 mm.

18. A pressurized fuel channel type nuclear reactor according to claim 14, wherein distance between said CHF enhancement appendage and a nearest end of said fuel elements is in a range of 5 cm to 20 cm.

19. A critical power enhancement system for a nuclear reactor which uses pressurized water as a coolant, said system comprising:

a pressure tube defining a fuel channel therethrough, said pressure tube having a length, an inlet for introducing said coolant into said fuel channel, and an outlet for discharging said coolant from said fuel channel;

a plurality of fuel bundles contained within said pressure tube, said fuel bundles being separated from each other forming water gaps therebetween, through which said coolant flows, each of said fuel bundles comprising a plurality of fuel elements separated from each other forming water gaps therebetween, through which said coolant flows, each of said fuel elements having opposed ends and a peripheral surface extending the length between said opposed ends, said length of each fuel element being parallel to said length of said pressure tube;

a plurality of spacers for separating said fuel elements from each other;

a plurality of bearing pads attached to outer fuel elements for providing load bearing to said fuel bundles;

a plurality of CHF enhancement appendages having a cylindrical shape and being attached to each of certain locations of certain said fuel elements along said length thereof and projecting outwardly from the peripheral surface of said each fuel element into said fuel channel for generating turbulence in said coolant flowing along said length of each of said fuel bundles within said fuel channel downstream of the locations of said CHF enhancement appendages;

each of said CHF enhancement appendages having a bottom where said CHF enhancement appendage is attached to one of said certain fuel elements, the cross-sectional area of each of said CHF enhancement appendage at said bottom thereof being in a range of 3 mm$^2$ to 11 mm$^2$, and the height of said CHF enhancement appendage from said bottom being in a range of 0.6 mm to 2.3 mm, each of said CHF enhancement appendages being attached at said bottom to one of said fuel elements and having no contact with the other fuel elements, one to four appendages being provided in each sub-channel defined by a space surrounded by some of said fuel elements;

the locations of said CHF enhancement appendages within said fuel bundle being such that the turbulence generated by said CHF enhancement appendages occurs at locations within the fuel bundle where CHF is most likely to occur.

20. A fuel bundle assembly according to claim 6, wherein said CHF enhancement appendage has no contact with any other fuel elements.

* * * * *